United States Patent [19]
Aznar et al.

[11] Patent Number: 5,666,361
[45] Date of Patent: Sep. 9, 1997

[54] ATM CELL FORWARDING AND LABEL SWAPPING METHOD AND APPARATUS

[75] Inventors: Ange Aznar, Saint Laurent du Var; Jean Calvignac, La Gaude; Jean-Luc Frenoy; Daniel Orsatti, both of Cagnes Sur Mer; Dominique Rigal, Nice; Luc Torres, Gattieres; Fabrice Verplanken, La Gaude, all of France

[73] Assignee: International Business Machines Corporation, Armonk, N.Y.

[21] Appl. No.: 547,826

[22] Filed: Oct. 25, 1995

[30] Foreign Application Priority Data

Apr. 5, 1995 [EP] European Pat. Off. .............. 95480040

[51] Int. Cl.$^6$ .................................................. H04L 12/56
[52] U.S. Cl. .................................. 370/392; 370/398
[58] Field of Search .................................. 370/355, 357, 370/359, 360, 386, 388, 389, 392, 395, 398, 428, 429, 905

[56] References Cited

U.S. PATENT DOCUMENTS

| | | | |
|---|---|---|---|
| 5,119,369 | 6/1992 | Tanabe et al. | 370/60 |
| 5,303,233 | 4/1994 | Sugawara | 370/392 |
| 5,311,509 | 5/1994 | Heddes et al. | 370/60 |
| 5,323,389 | 6/1994 | Bitz et al. | 370/60.1 |
| 5,394,397 | 2/1995 | Yanagi et al. | 370/60.1 |
| 5,440,547 | 8/1995 | Esaki et al. | 370/60.1 |
| 5,473,598 | 12/1995 | Takatori et al. | 370/399 |
| 5,555,256 | 9/1996 | Calamvokis | 370/60.1 |

OTHER PUBLICATIONS

European Search Report.

*Primary Examiner*—Alpus H. Hsu
*Attorney, Agent, or Firm*—Gerald R. Woods

[57] ABSTRACT

The techniques required to switch an ATM cell between an input adapter and an output adapter are enhanced by performing two look-up operations. The first look-up operation is performed in the input adapter which receives the cell to be switched. The first look-up operation retrieve the address of the target output port and a connection control block. The second look-up operation is performed in the target output adapter and makes use of the results of the input adapter search to retrieve the information need to complete the transfer of the cell to the target output port.

6 Claims, 7 Drawing Sheets

| GFC(4) | VPI(8) | VCI(12) | PTI/CLP(4) | UNI

| VPI(12) | VCI(12) | PTI/CLP(4) | NNI

| VPO(12) | VCO(16) | SWAP_CTR(4) |

UNI VPC

| VPO | VCO | x 0 1 1 |

| GFC | VPI | VCI | PT /CLP |

↓ Mix (320)

| GFC | VPO | VCI | PT /CLP |

UNI VCC

| VPO | VCO | x 0 1 0 |

| GFC | VPI | VCI | PT /CLP |

↓ Mix (320)

| GFC | VPO | VCO | PT /CLP |

FIG 6

NNI VPC

NNI VCC

Control_Cell

ATM CELL FORWARDING AND LABEL SWAPPING METHOD AND APPARATUS

FIELD OF THE INVENTION

The present invention relates to a method and apparatus for controlling the forwarding of Asynchronous Transfer Mode (ATM) cells through an ATM switch and more particularly to label swapping or header conversion functions of an ATM switch having input port adapters and output port adapters.

BACKGROUND OF THE INVENTION

An ATM switch generally comprises multiple input and output port adapters interconnected through a switching fabric. The main function of an ATM switch is to receive incoming ATM cells at the input ports and to redirect those cells to specific output ports for transmission into the surrounding network. Each cell includes a label or header containing routing information in the form of a Virtual Path Identifier (VPI) field and a Virtual Cell Identifier (VCI) field. The ATM switch reads these fields in each received cell and performs a table look-up operation in the input adapter in order to locate the target output adapter for the particular cell and to find new VPI/VCI values that are to be written (swapped) into the cell's label for use by the next ATM switch along the cells route.

In prior art ATM switches, the table look-up operations are performed only at the input adapters and all information obtained from the look-up operations, including the target output adapter identification and the new VPI/VCI values, must be transferred through the ATM switch to the appropriate output adapter. To reduce the amount of additional information that must be transferred through the switch, the new VPI/VCI values are written into the cell's label before the cell is transferred through the switching fabric to the target output adapter. The output adapter must rely on information received from the input adapter look-up operation in transferring the switched cell to the appropriate output port. An example of such a system is described in W. Fischer et al, "A Scalable ATM Switching System Architecture", *IEEE Journal on Selected Areas in Communication*, Vol. 9, No. 8, October 1991, pages 1299–1307.

The prior art has the drawback that dedicated processing of a cell with regard to a single connection is not possible on the output side of the ATM switch. The ability to provide such dedicated processing is desirable, however, to be able to support forwarding of ATM cells on the basis of assigned Quality of Service (QoS) properties. The term QoS refers generally to the fact that different cells may need to be treated differently; e.g., some cells may be given higher priority for transmission than other cells.

SUMMARY OF THE INVENTION

Depending on QoS requirements, a cell may need to be directed to different output queues having specific management and scheduling properties. The processing of a cell may be different at the input and the output adapters. For example, a class Y VCC connection of a port Pi of the input adapter may be aggregated with other such connections into a class A VPC connection of port Pj of the output adapter. Such a case can occur when connecting a Local Area Network (LAN) to a Wide Area Network (WAN) through the ATM switch.

An important feature of the present invention is the use of a second look-up table at the output adapter side of the switching fabric of an ATM switch. Performing a table look-up on the output adapter side permits cells to be queued on the basis of their QoS properties. It also permits different cell processing operations to be performed on the input and output sides of the switching fabric and, additionally, the assignment of new ATM labels to a switched cell to support multicasting of the cell.

To reduce the complexity of the look-up operation at the output adapter, an improved embodiment of the invention makes use of at least part of the results of the look-up operation performed at the input adapter by exchanging (look-up) connection identifier signals through the switching fabric.

In an alternative embodiment of the invention, the label swapping function is enhanced by storing the new ATM header information (the swapping information) in the memory usually reserved for the ATM cell data payload.

These and other novel features and advantages of the present invention will become more apparent from the following description of specific embodiments of the invention accompanied by the below-listed drawings.

BRIEF DESCRIPTION OF THE DRAWINGS

FIGS. 3 through 7 represent successive stages of operation on an ATM cell header in accordance with the invention.

DESCRIPTION OF PREFERRED EMBODIMENTS

Figure 1:
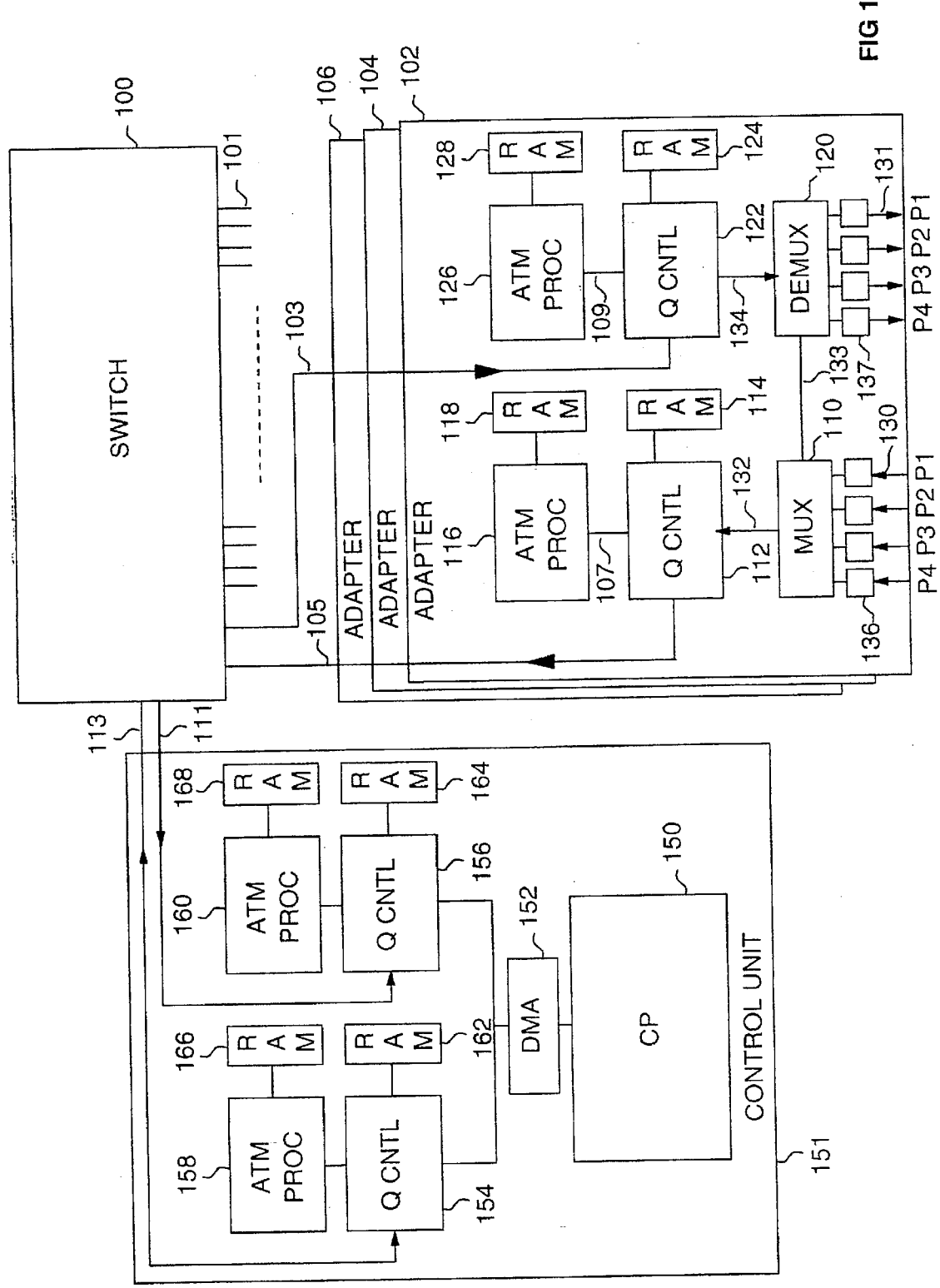
FIG. 1 is a view of components of an ATM switch.

FIG. 1 shows the components of a typical ATM switch. A switching fabric 100, capable of switching cells from any of a number of input/output (I/O) leads to any other of such leads, is connected to a switch controller 151 through leads 111 and 113 and to an adapter 102 through leads 103 and 105. Additional adapters, such as adapters 104 and 106, are typically similarly connected to the switching fabric 100 through similar leads (not illustrated). Switch controller 151 includes a control processor 150, which may be a microprocessor. The control processor is connected through a DMA transfer controller 152 to a queuing controller 154 used for queuing data to be delivered to the switching fabric 100 over lead 113. The queuing controller 154 is connected to a processor 158 used to provide ATM layer handling for the queued data. The operations performed by queuing controller 154 and ATM layer processor 158 make use of random access memory (RAM) elements 162 and 166, respectively. Data received from switching fabric 100 over lead 111 is received in a second queuing controller 156 connected both to the DMA transfer controller 152 and to an ATM layer processor 160. The queuing controller 156 and ATM layer processor 160 make use of RAM 164 and 168, respectively.

One of the primary functions of adapters, such as adapter 102, is to concentrate traffic received on a number of ATM ports so that standard ATM cell processing functions, including an ATM Transmission Convergence (TC) sublayer function, can be performed in the switch. The number of adapters that can be included in the switch is a function of the size of the switching fabric 100. The adapter 102 includes a multiplexer 110 for concentrating cells received from different ones of ATM input ports 130 at the ATM UNI (User-to-Network Interface) interface and a de-multiplexer 120 for distributing ATM cells destined for different ones of ATM output ports 131, also at the ATM UNI interface. Different media (such as copper wire or optical fiber) may be used to carry ATM cells. To accommodate the differences in media, physical media-dependent interface circuits 136 and 137 are connected to the multiplexer 110 and demultiplexer 120, respectively. Like the switch controller 151, adapter 102 includes queuing controllers 112 and 122 for ATM data being delivered to and received from the switching fabric 100. Adapter 102 also includes ATM layer processors 116 and 126 for performing ATM layer functions in incoming and outgoing ATM data units. The buffers 112 and 122 are connected to RAM elements 114 and 124, respectively, while the ATM layer processors 116 and 126 are connected to RAM elements 118 and 128, respectively.

In the described arrangement, ATM data received at any of the input ports 130 on adapter 102 can be exchanged with the control processor 150 or with any of the output ports 131 on adapter 102 or corresponding output ports on other adapters, such as adapters 104 and 106.

The ATM switch implementation described above is illustrative of an environment in which the present invention may be implemented. The invention can also be implemented in a more highly integrated system, such as a system in which the control processor and adapter function are integrated into a single device, or in a system using a switching element other than the normal ATM switching fabric. An example of an alternative switch would be a bus.

Figure 2:
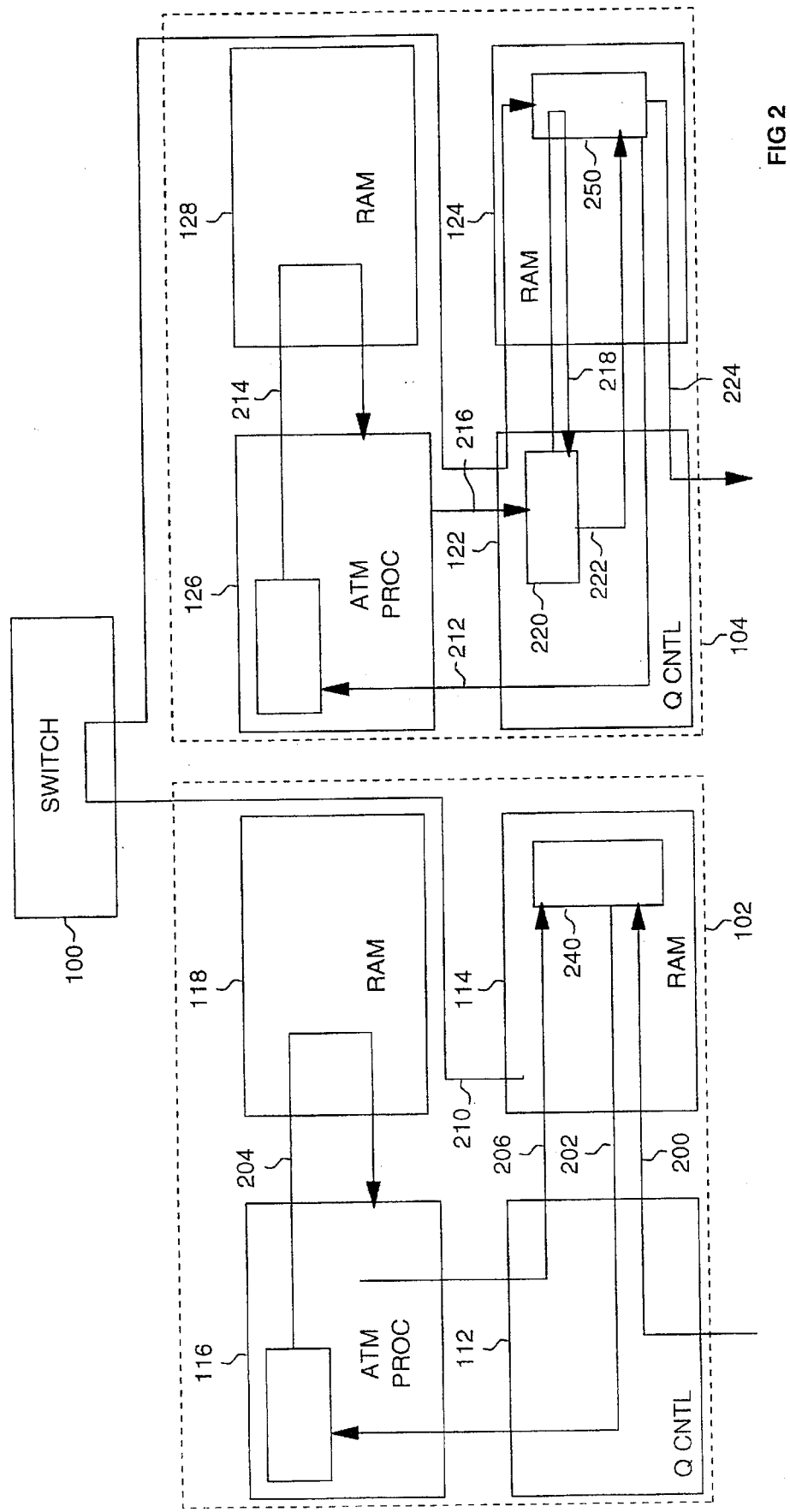
FIG. 2 is a block diagram of a preferred embodiment of the present invention.

A first embodiment of the invention is described below primarily with references to FIG. 2 but with some references back to FIG. 1. FIG. 2 describes the paths taken by incoming data received at one of the input ports of adapter 102. The cell follows a path 200 to a specific cell buffer 240 in RAM 114. Source Port information SP is delivered to the ATM layer processor 116 on a path 202 along with the ATM label of cell stored in buffer 240 to enable processor 116 to perform the necessary table look-up operation. In a standard ATM cell, the source port information is encoded in four bits in the cell while the VPI/VCI fields occupy twenty-eight bits, yielding a thirty-two bit pattern for the table look-up operation.

The look-up result is a connection identifier LCBAu for the cell. The controller 116 accesses a connection control block address (path 204) in the RAM 118 to identify the target output adapter to which the cell must be forwarded. The controller also retrieves a field identifying the class of traffic to which the cell belongs. Examples of different classes of traffic are the different Qualities of Service considered standard in ATM technology. Different classes of traffic require different processing operations.

The connection identifier LCBAu and the traffic type identifier are returned to buffer 240 over path 206 to identify the target adapter, the source adapter and the source port for the cell. The source adapter and source port information are needed by the target adapter, in this case adapter 104, to identify the connection to which the cell belongs. The ATM label uniquely identifies a particular link on an adapter, for example, an incoming link connected to port Pi in adapter 102. This means the same label could be used to identify the corresponding link on any adapter. Consequently, in order to identify a connection, a target adapter must look up the ATM label of the cell along with the source adapter and source port information.

The cell containing the target adapter information is forwarded along a path 210 to the switching fabric 100, which uses the target adapter information to forward the cell to the target adapter 104 in the illustration. The cell is written into a cell buffer 250 in RAM 124. Source adapter and source port information and ATM label information are extracted from the contents of cell buffer 250 and directed to the ATM layer processor 126 along a path 212. Using this information, the ATM layer processor 126 performs a second look-up operation using the thirty-six bit pattern (four bits for each of the source adapter and source port fields and twenty-eight bits for the VPI/VCI fields). Using the thirty-six bit pattern, the processor 126 accesses the appropriate address in RAM 128 to retrieve a connection identifier LCBAd. The connection identifier identifies the target port to which the cell is to be forwarded and the class of traffic to which the cell belongs. Additionally, the retrieved information includes the VPI and VCI values which control the transfer of the cell to a particular port Pj and swap control information, such as whether the connection is a VCC (Virtual Channel Connection) or VPC (Virtual Path Connection) and whether the port is a UNI (User-to-Network Interface) or a NNI (Network-to Network Interface).

The information resulting from the second look-up is forwarded to a label swap function 220 along path 216. The label swap function retrieves the original cell header, including the original VPI and VCI information, from RAM 124 and generates a new cell header in accordance with the swap controlling information. The new ATM label is written back into the cell buffer 250 along a path 222. The cell, with its newly-modified header, is forwarded to the target port Pj through the appropriate queue and demultiplexer.

The embodiment described above calls for two look-up operations, each involving a relatively large bit pattern. The look-up operation in the input adapter 102 is performed using the thirty-two bit pattern based on the ATM label and source port for the cell being switched. The look-up operation in the output or target adapter uses a thirty-six bit pattern based on the ATM label, the source port and the source or input adapter. The large bit patterns used for the look-up operations require more hardware resources and machine cycles. Since the look-up operations must be performed for every cell to be switched, system performance can be significantly affected.

Further the label swap function requires a read operation for obtaining new VPI/VCI values plus a read operation to obtain necessary swap control information plus a read-modify-write operation in order to modify the cell header. Thus, for the embodiment of the invention described above, the label swap operation performed on each cell requires four accesses to RAM and a considerable number of operations required to move the cell from the switching fabric 100 to the appropriate output port Pj. In an alternate embodiment of the invention, to be described with reference to FIG. 8, the need for a thirty-six bit pattern look-up operation is avoided and the ATM label swap is accelerated to permit label swapping to be performed on outgoing cells on the fly. The basic arrangement of elements is the same both for the first-described embodiment and for the alternate embodiment and most of the elements perform the same basic functions in the same way. Elements in the alternate embodiment which have counterparts in the first-described embodiment are designated by a prime (') following the element number. The differences in the elements and the functions they perform are described below.

In the alternate embodiment, the thirty-two bit pattern look-up operation performed in the input adapter 102' yields a connection identifier LCBAu which identifies the connection to which the cell belongs. The complexity of the look-up operation which must be performed in the output adapter 104' is significantly reduced by using a specifically defined result (i.e., the LCBAu identifier) of the look-up operation already performed in the input adapter 102'. To identify the appropriate connection at the output adapter 104', it is necessary only to add the input (or source) adapter (SA) information to the LCBAu identifier, the SA-LCBAu pattern being unique in the output adapter.

Using this alternate approach, the size of the pattern involved in the look-up operation at the output adapter can be significantly reduced from the thirty-six bit pattern used in the first-described embodiment. The size of the LCBAu identifier depends on the number of connections supported by an adapter. In a preferred embodiment LCBAu is twelve bits wide to support approximately four thousand connections, meaning that the look-up operation in the output adapter can be based on a sixteen bit pattern.

A sixteen bit pattern look-up can be realized simply by addressing a 64K direct table. The look-up operation requires only a single access cycle with such a table. By comparison, a look-up operation based on a thirty-six bit pattern requires dedicated look-up hardware such as a content addressable memory or the use of a binary tree approach. The binary tree approach has disadvantages. Using a 64K table, a binary tree look-up would require up to twenty-one access cycles and all of the control blocks required to complete the binary tree would need to be added to the 64K table.

The second advantage of the alternate embodiment is that it permits the label swap function to be performed on the fly during cell transfer from the RAM 124' on output adapter to the connection to the output adapter's demultiplexer. This improvement is made possible by creating, in RAM 124', a linear area 370 which holds shadow control blocks containing the new VPI and VCI values and the swap controlling information. There is a one-to-one correspondence between the connection control blocks in the RAM 128' and the shadow control blocks in the RAM 124'. This reduces the amount of information that needs to be exchanged between the ATM layer processor 126' and the queuing controller 122'.

In this embodiment of the invention, the RAM 124' has thirty-two bit (one word) memory locations and a shadow control block occupies exactly one word in the RAM. A shadow control block contains the new VPI, which is eight bits for a UNI interface and twelve bits for a NNI interface in the case of a VPC and contains the new VPI and VCI values in the case of a VCC. The new VPI and VCI values are mapped into the thirty-two bit word in the RAM in the same way the VPI and VCI are mapped into the header of an ATM cell having the known UNI and NNI formats illustrated in FIG. 3.

As PT (Payload Type) and CLP (Cell Loss Priority) bits in an ATM header remain unchanged, the present invention uses the four bits dedicated to these indicators to encode the swap control field. The swap control field contains information indicating whether the cell is a user cell or an internal control cell. Reference may be made to a copending application Ser. No. 08/547,825 entitled "Method and Apparatus for Efficient Hardware Software Interface in a Communication System" for a complete description of a control cell, which is a cell used for exchanging internal commands through the switching fabric. No label swapping is performed for control cells since these cells are used only as an internal correlator.

In the case of a user cell, two other items of information are necessary. The first item is whether the connection to which the cell belongs is a VPC or VCC connection. The second item indicates whether the target port to which the cell is to be forwarded is a UNI or NNI. In the NNI case, the virtual path is a twelve bit pattern while in the UNI case, the virtual path is eight bits wide with the other four bits forming a generic flow control field (GFC). The GFC remains unchanged during the label swap operation.

Figures 3, 4, 5:
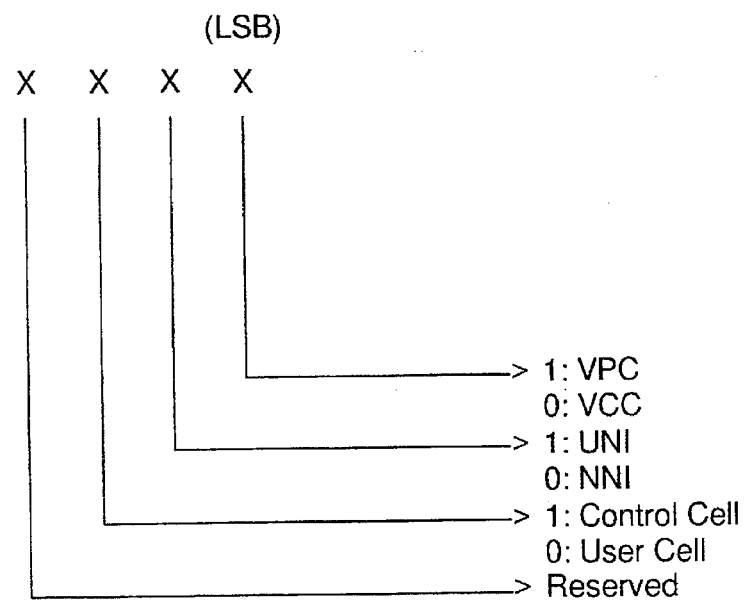

FIG. 4 shows the format of the shadow control block and FIG. 5 shows the possible meanings of each of the four bits in the swap control field within the shadow control block.

Since the new label identifiers and the swap controlling information are mapped together, a single read operation is required to access the information in the RAM 124'. By storing the information in the same RAM, label swapping can be performed on the fly, that is, during cell transfer from the RAM 124' to the output adapter's demultiplexer. The shadow control block in the linear area 370 is read first. Then the queuing processor 122' begins reading the contents of the cell buffer 250' in the buffer area 360 of RAM 124'. The first read is of the incoming ATM header which is combined on the fly with the content of the previously read shadow control block according to the swap control field.

Figure 7:
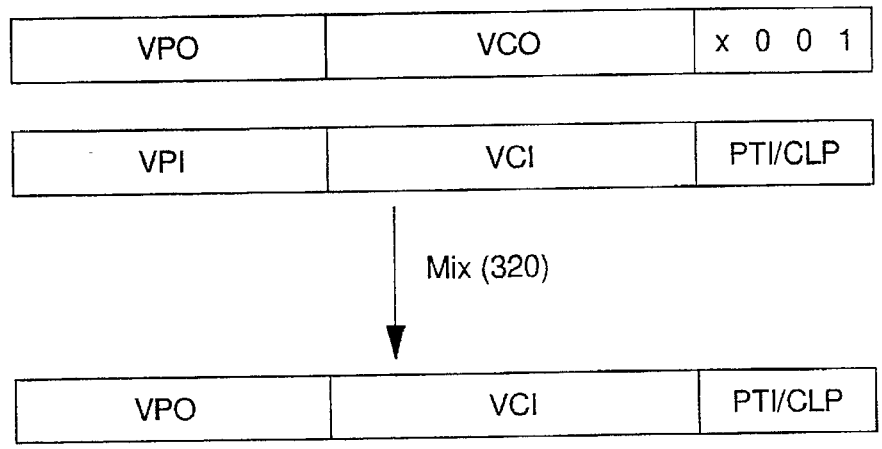
Figure 7:
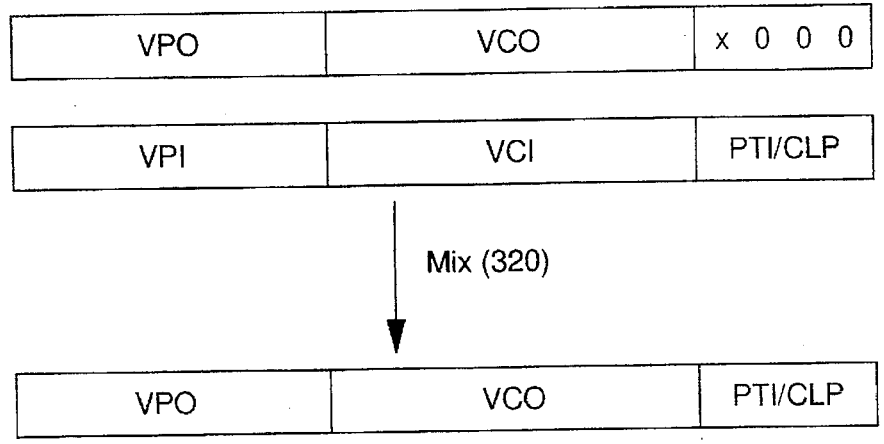
Figure 7:
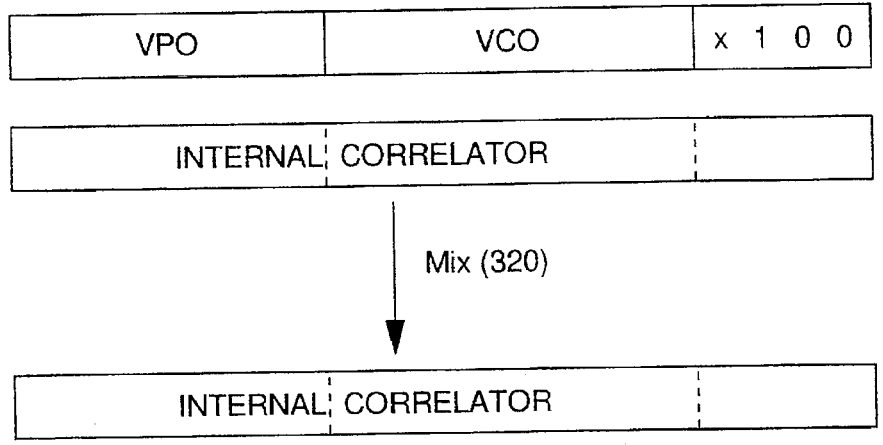

In addition to reducing the amount of information that must be exchanged between the ATM layer processor 126' and the queuing processor 122', this solution permits the swap function to be realized using a single additional read cycle with regard to cell data movement, as compared to the four extra cycles required in the first-described embodiment. The different possible types of swaps are illustrated in FIGS. 6 and 7.

Figure 8:
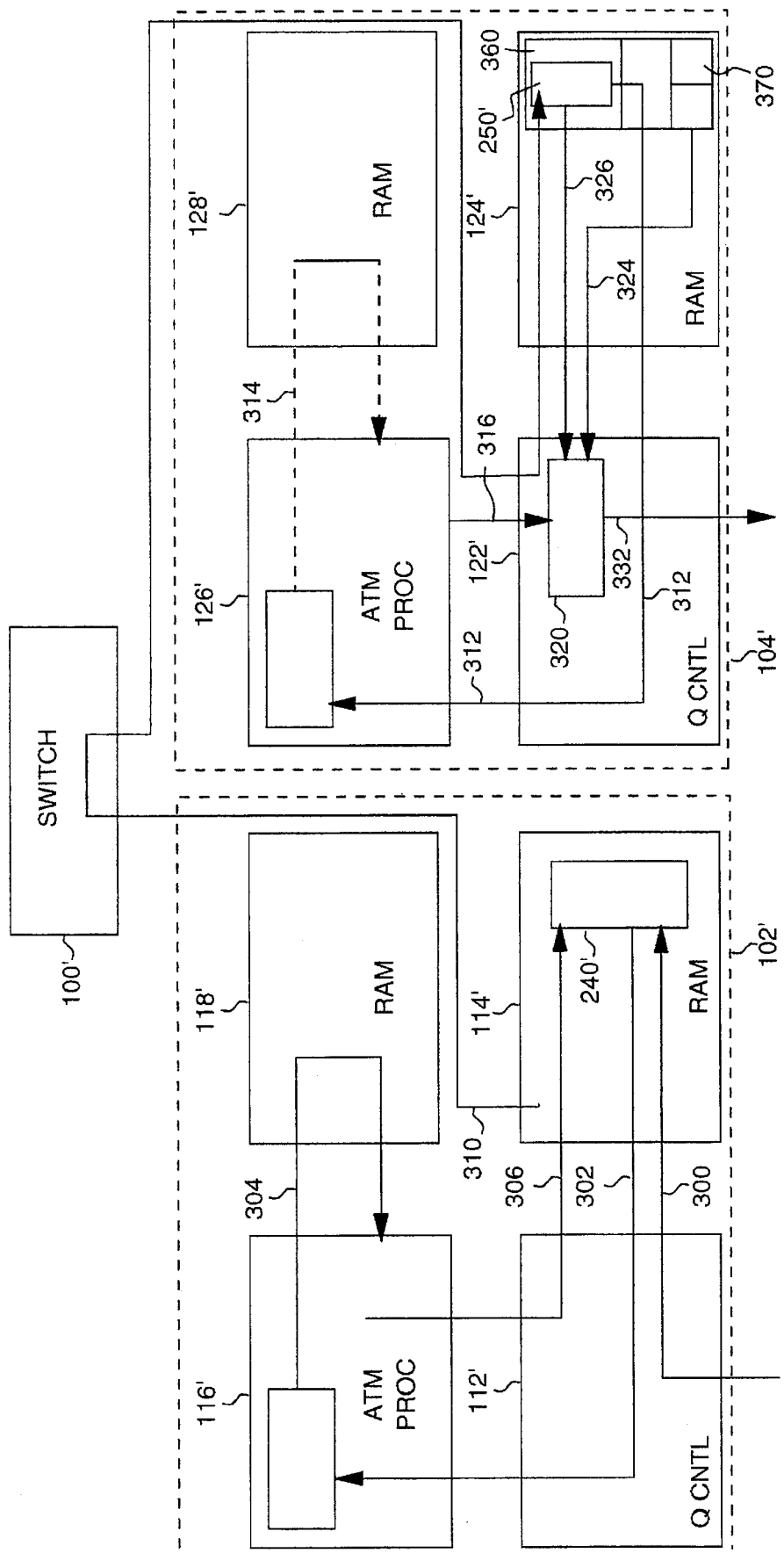
FIG. 8 illustrates an alternate embodiment of the invention.

FIG. 8 describes the cell processing for the alternate embodiment of the invention. The arriving cell is moved along path 300 to a cell buffer 240 in RAM 114' in the input adapter 102'. The source adapter (SA) information and the ATM label of the cell are transferred to the ATM layer processor 116' along path 302 to enable performance of the table look-up operation. As noted elsewhere, the pattern used to perform the table look-up in the input adapter is thirty-two bits long. The result of the look-up operation is the connection identifier LCBAu. The ATM layer processor 116' reads the RAM 118' contents at the connection control block address to identify the target or output adapter to which the cell is to be forwarded and to obtain any cell class or type information stored in the RAM. After completion of the cell processing, the data written into RAM 114' (along path 304) includes target adapter information, source adapter information and the connection identifier LCBAu.

The modified cell is forwarded to switching fabric 100' along path 310. The switching fabric uses the target adapter information to switch the cell to output adapter 104', where the cell is stored in a cell buffer 250' in the RAM 124'. The connection identifier LCBAu and the source adapter data are retrieved from cell buffer 250' and forwarded to the ATM layer processor 126' along path 312 to permit the second look-up operation to be performed using data stored in RAM 128'. The look-up operation follows path 314 and yields the connection identifier LCBAd, which is transferred along path 316 to the queuing controller 122'.

The first step in generating the new header for the cell in queuing controller 122', requires that the shadow control block stored in linear area 370 of RAM 124' be retrieved along path 324. Also noted elsewhere, the shadow control block includes the new label identifiers and the swap control information. The switched cell is retrieved from cell buffer 250 into a header generator function 320 along a path 326 where the new header is written into the cell. The modified cell is transferred along path 332 to a target port Pj through the output adapter demultiplexers.

Figure 9:
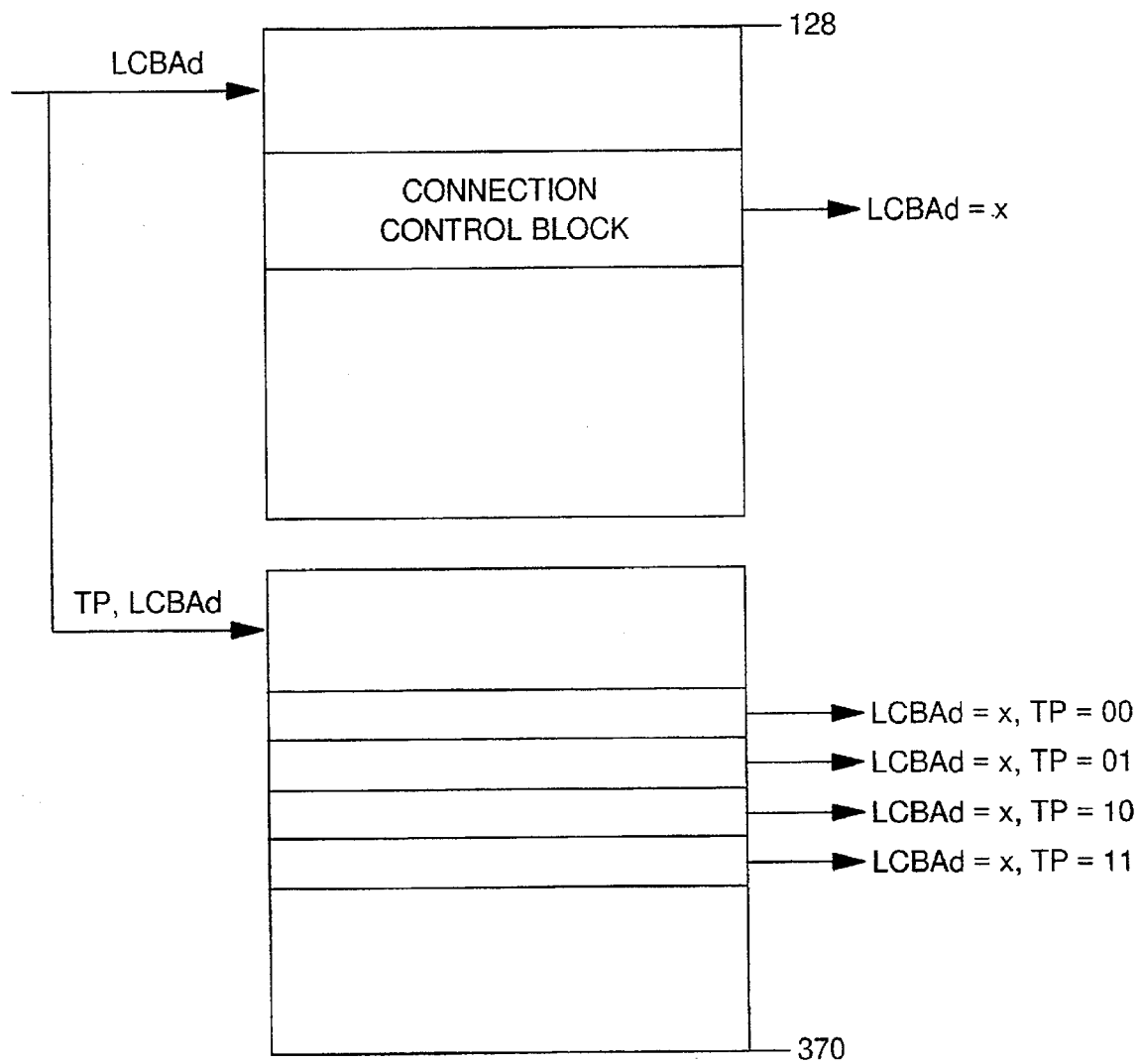
FIG. 9 illustrates an extension of the alternate embodiment of FIG. 8.

A further enhancement of the invention would be to associate several shadow control blocks with one connection. For instance, a single shadow control block could be assigned to each port on the output adapter. This would permit multicasting the output UNI and NNI ports, which require different swapping operations. This would also permit a cell to be multicast with different VPI and VCI values for different ports. This enhancement would require more storage in the linear area 370 but would still support on-the-fly swapping as previously described. The address of the appropriate shadow control block would be built by combining the target port information with the connection identifier LCBAd to establish a correspondence between a connection control block in the RAM 128' and the number of port shadow control blocks in the linear area 370 of RAM 124'. FIG. 9 illustrates this extension in the case of a blade supporting four ports.

While there have been described what are considered to be preferred embodiments of the present invention, variations and modifications in those embodiments will occur to those skilled in the art once they are made aware of the basic inventive concepts. Therefore, it is intended that the appended claims shall be construed to include both the preferred embodiments and all such variations and modifications as fall within the true spirit and scope of the invention.

What is claimed is:

1. In an ATM switch having one or more input adapters and one or more output adapters and a switching fabric for switching ATM cells received on ports on said input adapter to target ports on said output adapters, the improvement in such apparatus comprising:

on each input adapter, an input adapter memory and an input ATM layer processor for reading the header of each ATM cell received by said input adapter and for performing an input table look-up operation based on said header in said adapter memory to retrieve at least part of the information required to allow the cell to be switched to the appropriate target port on an output target adapter and for adding the retrieved information to the cell for transmission through the switching fabric without removing the header of the cell; and on each output adapter, an output adapter memory and an output ATM layer processor for retrieving at least part of the results of the input table look-up operation from a received cell and for using said results in performing an output table look-up operation in said output adapter memory to retrieve the remainder of the information required to complete the transfer of the cell to the appropriate target port and for generating a new header for the cell.

2. The apparatus set forth in claim 1 wherein the input table look-up operation derives an address for the target output adapter and a block of internal connection information and wherein the block of internal connection information is transferred to the output ATM layer processor for the target output adapter for use in the table look-up operation to be performed by the target output adapter.

3. An apparatus as set forth in either of claims 1 or 2 wherein the output table look-up operation retrieves all header information and label swapping information required for generation of a modified header for the cell being processed.

4. For use in an ATM switch having one or more input adapters and one or more output adapters and a switching fabric for switching ATM cells received on ports on said input adapter to target ports on said output adapters, an improved cell switching method comprising:

for each cell received at an input adapter, reading at least a portion of the header of the cell and performing an input table look-up operation based on said header in the input adapter to retrieve at least part of the information required to transfer the cell to a target port on a target output adapter and adding the retrieved information to the cell for transmission through the switching fabric without removing the header of the cell; and for each cell received at an output adapter retrieving at least part of the results of the input table look-up operation performed for the cell in the input adapter from the cell and performing an output table look-up operation performed for the cell in the input adapter from the cell and performing an output table look-up operation, using the information, to retrieve the additional information required to complete the transfer of the cell to the appropriate target port on the target output adapter and generating a new header for the cell.

5. The method set forth in claim 4 wherein the input table look-up operation includes the steps of, at the input adapter, retrieving an address for the output adapter and a block of internal connection information and transferring the block of internal connection information to the output ATM layer processor for the target output adapter for use in the table look-up operation to be performed by the output adapter.

6. The method set forth in claims 4 or 5 wherein the output table look-up operation comprises the steps of:

retrieving all header information and label swapping information required for generation of a modified header for the cell being processed.

* * * * *